United States Patent
Kwok et al.

(10) Patent No.: US 10,405,368 B2
(45) Date of Patent: Sep. 3, 2019

(54) CELLULAR DUAL CONNECTIVITY SETUP

(71) Applicant: T-Mobile USA, Inc., Bellevue, WA (US)

(72) Inventors: Ming Shan Kwok, Seattle, WA (US); John Humbert, Olathe, KS (US); Wei-Ming Lan, Morrisville, NC (US); Scott Francis Migaldi, Cary, IL (US); Neng-Tsann Ueng, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 28 days.

(21) Appl. No.: 15/868,888

(22) Filed: Jan. 11, 2018

(65) Prior Publication Data

US 2019/0098681 A1 Mar. 28, 2019

Related U.S. Application Data

(60) Provisional application No. 62/568,983, filed on Oct. 6, 2017, provisional application No. 62/562,194, filed on Sep. 22, 2017.

(51) Int. Cl.
*H04W 76/15* (2018.01)
*H04W 52/36* (2009.01)
*H04W 52/24* (2009.01)

(52) U.S. Cl.
CPC ......... *H04W 76/15* (2018.02); *H04W 52/243* (2013.01); *H04W 52/367* (2013.01); *H04W 52/365* (2013.01)

(58) Field of Classification Search
None
See application file for complete search history.

(56) References Cited

U.S. PATENT DOCUMENTS

| | | | |
|---|---|---|---|
| 8,675,544 B1 * | 3/2014 | Hirsch | H04B 7/2656 370/322 |
| 8,773,969 B1 * | 7/2014 | Zhang | H04L 27/2602 370/208 |

(Continued)

OTHER PUBLICATIONS

"3GPP RP-172064 Single Tx switched UL", 3GPP, Sep. 11, 2017, retrieved from http://www.3gpp.org/ftp/TSG_RAN/TSG_RAN/TSGR_77/Docs/RP-172100.zip on Nov. 16, 2017, 4 pages.

(Continued)

*Primary Examiner* — Ayaz R Sheikh
*Assistant Examiner* — Tarell A Hampton
(74) *Attorney, Agent, or Firm* — Lee & Hayes, P.C.

(57) ABSTRACT

A mobile communications device is configured to implement dual connectivity, using both a Long-Term Evolution (LTE) radio and a $5^{th}$-Generation (5G) radio, for communicating with respective base stations of a cellular network. A primary transmission uplink is established in a first radio frequency band using the LTE radio. The device may then receive a request to establish a secondary transmission uplink in a second frequency band. Upon receiving the request, the device determines whether it can support concurrent use of the primary and secondary frequency bands while maintaining adequate receiver sensitivity. If the device cannot support such concurrent use, the device refuses the request. In addition, the device provides data indicating the degree by which certain performance parameters would be out-of-tolerance if the secondary connection were to be established.

18 Claims, 4 Drawing Sheets

(56) References Cited

U.S. PATENT DOCUMENTS

| | | | | |
|---|---|---|---|---|
| 9,210,687 | B1* | 12/2015 | Reeves | H04W 36/0022 |
| 9,288,844 | B1* | 3/2016 | Akhavan-Saraf | H04W 88/10 |
| 2004/0203960 | A1* | 10/2004 | Nagato | H04W 88/06 |
| | | | | 455/466 |
| 2007/0014267 | A1* | 1/2007 | Lam | H04W 48/10 |
| | | | | 370/338 |
| 2008/0080414 | A1* | 4/2008 | Thubert | H04W 76/12 |
| | | | | 370/328 |
| 2008/0139200 | A1* | 6/2008 | Zhu | H04W 16/14 |
| | | | | 455/426.1 |
| 2008/0227488 | A1* | 9/2008 | Zhu | H04W 88/06 |
| | | | | 455/553.1 |
| 2010/0075600 | A1* | 3/2010 | Haartsen | H04W 88/06 |
| | | | | 455/41.2 |
| 2011/0194427 | A1* | 8/2011 | Shirota | H04W 36/0022 |
| | | | | 370/252 |
| 2012/0155381 | A1* | 6/2012 | Ballantyne | H04W 52/0274 |
| | | | | 370/328 |
| 2012/0257549 | A1* | 10/2012 | Chin | H04W 36/14 |
| | | | | 370/280 |
| 2012/0281638 | A1* | 11/2012 | Ly-Gagnon | H04W 8/005 |
| | | | | 370/329 |
| 2013/0203417 | A1* | 8/2013 | Ramachandran | H04W 36/06 |
| | | | | 455/436 |
| 2014/0004849 | A1* | 1/2014 | Su | H04W 24/08 |
| | | | | 455/423 |
| 2014/0086209 | A1* | 3/2014 | Su | H04W 74/02 |
| | | | | 370/331 |
| 2015/0131536 | A1* | 5/2015 | Kaur | H04L 5/001 |
| | | | | 370/329 |
| 2016/0135213 | A1* | 5/2016 | Zhu | H04L 1/00 |
| | | | | 370/329 |
| 2017/0222876 | A1 | 8/2017 | Van Der Velde et al. | |
| 2018/0242271 | A1* | 8/2018 | Rune | H04W 60/005 |

OTHER PUBLICATIONS

"GPP RP-172085 Signaling for Single/Dual UL Tx", 3GPP, retrieved from http://www.3gpp.org/ftp/TSG_RAN/TSG_RAN/TSGR_77/Docs/RP-172100.zip on Nov. 16, 2017, 2017, 2 pages.

"3GPP RP-172100: LS on single Tx switched UL", 3GPP Sep. 11, 2017, retrieved from http://www.3gpp.org/ftp/TSG_RAN/TSG_RAN/TSGR_77/Docs/RP-172100.zip on Nov. 16, 2017, 1 page.

"3GPP TS 36.101 V15.0.0 (Sep. 2017)", 3GPP Organizational Partners, downloaded from http://www.3gpp.org/ftp//Specs/archive/36_series/36.101/36101-f00.zip on Nov. 16, 2017, 1547 pages.

Ericsson, "Power sharing for LTE-NR dual connectivity", R1-1714460, 3GPP TSG RAN WG1 Meeting #90, Prague, Czech Republic, Aug. 12, 2017, pp. 1-3.

Huawei et al., "TDM of LTE and NR uplinks for LTE-NR dual connectivity", R1-1712163, 3GPP TSG RAN WG1 Meeting #90, Prague, Czech Republic, Aug. 12, 2017, pp. 1-7.

Nokia et al., "Support for single Tx UE in LTE-NR UL dual connectivity", R1-1714359, 3GPP TSG RAN WG1 Meeting #90, Prague, Czech Republic, Aug. 11, 2017, pp. 1-3.

The PCT Search Report and Written Opinion dated Dec. 19, 2018 for PCT Application No. PCT/US2018/051301, 11 pages.

Qualcomm Incorporated, "Power sharing for LTE-NR dual connectivity", R1-1713478, 3GPP TSG RAN WG1 Meeting #90, Prague, Czech Republic, Aug. 12, 2017, pp. 1-3.

* cited by examiner

CELLULAR DUAL CONNECTIVITY SETUP

CROSS-REFERENCE TO RELATED APPLICATION

This application claims priority to a co-pending, commonly owned U.S. Provisional Patent Application No. 62/562,194 filed on Sep. 22, 2017, and titled "Dynamic Uplink Power Control Method for Multi-Connectivity UE and Method for Multi-Connectivity Uplink Transmission Control," which is herein incorporated by reference in its entirety.

This application also claims priority to a co-pending, commonly owned U.S. Provisional Patent Application No. 62/568,983 filed on Oct. 6, 2017, and titled "Intelligent Transmitter Selection for UE Dual Connectivity," which is herein incorporated by reference in its entirety.

BACKGROUND

Existing Long-Term Evolution (LTE) systems use relatively low radio frequencies, such as frequencies in bands below 5 GHz. $5^{th}$-Generation (5G) systems are able to use an extended range of frequency bands compared to LTE, such as bands in the 30-300 GHz spectrum. Radio communications using the higher frequency 5G bands can support higher data speeds, but also have disadvantages compared to the lower frequency LTE bands. Specifically, radio signals in the higher frequencies have shorter range and are more easily blocked by physical objects.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
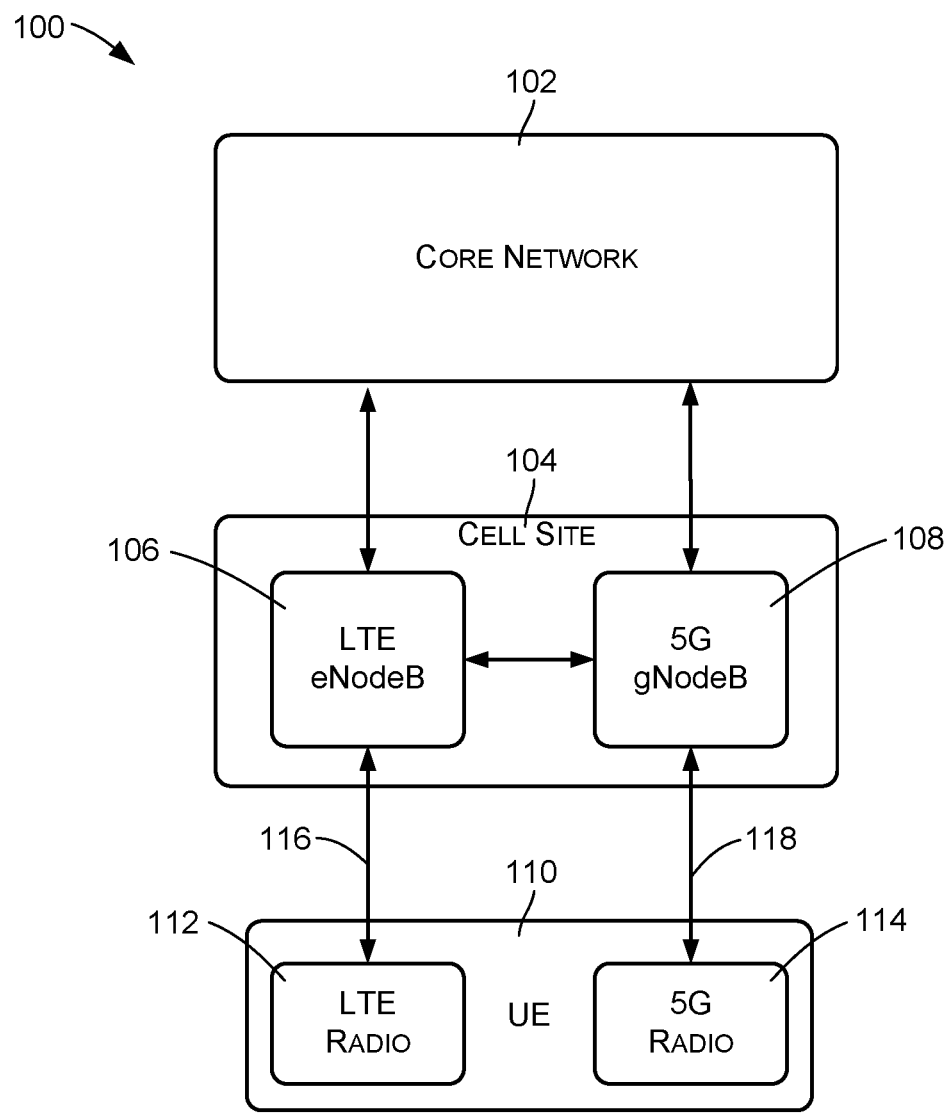
FIG. 1 is a block diagram of a telecommunications system that implements dual connectivity using LTE and 5G air interfaces.

A configuration proposed by the $3^{rd}$-Generation Partnership Project (3GPP), referred to as Non-Standalone (NSA), uses 5G radio technologies to augment Long-Term Evolution (LTE) telecommunication capabilities.

NSA uses Dual Connectivity (DC), in which a user equipment (UE) uses both an LTE radio and a 5G radio for uplink transmissions. An LTE carrier is used for control-plane messaging and for user-plane communications. A 5G carrier is used for additional user-plane bandwidth.

Using certain combinations of LTE and 5G radio frequency bands for simultaneous uplink transmissions, however, may produce intermodulation products that fall within a frequency band that is being used for downlink to the UE. Intermodulation products such as this can degrade UE receiver sensitivity. The degree of sensitivity degradation depends on the particular bands of the LTE/5G combination, and may also depend on characteristics of the UE.

In the NSA system proposed by the 3GPP, each of all possible LTE/5G band/RF carrier combinations is designated as being either "easy," "intermediate," or "difficult," corresponding to the ease or difficulty of minimizing sensitivity degradation when using the band combination.

In accordance with techniques described herein, a UE initially establishes a primary uplink carrier with an LTE base station. The primary uplink carrier is used for both user-plane communications and control-plane messaging, and is said to anchor a communication session. The core network may then use control-plane messaging through the primary carrier to request a secondary, 5G uplink carrier. More specifically, an RRC Connection Reconfiguration request is sent to the UE through the primary carrier, specifying a 5G frequency band and channel to be used for a secondary carrier. Upon acceptance of the request, the UE attempts to establish a secondary, 5G carrier between the UE and a 5G base station.

In some cases, it may not be possible to set up the secondary 5G carrier, due to an unacceptable level of intermodulation distortion that would occur if using the specified 5G frequency band in combination with the frequency band of the LTE primary carrier. In particular, this may be the case with a "difficult" frequency band combination that has been requested for the primary and secondary carriers, where the particular UE cannot use the band combination while maintaining acceptable receiver sensitivity levels.

If the base station has requested simultaneous uplink transmissions, but the UE is unable to use the secondary 5G carrier because of the unacceptable impact it would have on receiver performance, the UE replies to the RRC Connection Reconfiguration request with a refusal. In addition, the UE returns data relating to (a) the reduction in receiver sensitivity that would be present if the requested uplink configuration were to be used and/or (b) amounts by which UE output power would need to be reduced to meet regulatory requirements or 3GPP specification requirements for receiver sensitivity.

Knowledge of this data may allow the network to adapt its behavior to optimize coverage and capacity. For example, the network may apply mitigation techniques such as changing resource block (RB) length, changing RB power, and/or assigning new carriers, which might improve the performance of the UE to optimize the number of UE's supporting dual simultaneous transmissions. More specifically, the network may use the returned information to formulate a new configuration for the UE and/or for other UEs, and may then send another request to the UE in accordance with the new configuration. This process may be repeated until the UE indicates that it can support the requested frequency band.

In some cases, a network may have the option of (a) using a single LTE carrier for communications with a UE, (b) using an LTE carrier and a 5G carrier in parallel, or (c) using time division multiplexing (TDM) of an LTE carrier and a 5G carrier to avoid intermodulation effects. Knowledge of the parameters described above may allow the network to determine which of these techniques might provide the best performance.

FIG. 1 illustrates relevant high-level components of a cellular communication network 100. The communication network 100 has a core network 102, which may comprise a Long-Term Evolution (LTE) core network, a 5G core network, or both an LTE core network and a 5G core network.

FIG. 1 shows a single cell site 104 of the communication network 100, which may be one of many such cell sites of the communication network 100. The cell site 104 supports both LTE and 5G communications, and therefore has an eNodeB 106 for LTE-based communications and a gNodeB 108 for 5G-based communications. An eNodeB is a base station that implements LTE communication technologies. A gNodeB is a base station that implements 5G communication technologies.

The core network 102 may communicate individually with the eNodeB 106 and the gNodeB 108 as shown. In other embodiments, communications between the gNodeB 108 and the core network 102 may be through the eNodeB 106, or communications between the eNodeB 106 and the core network 102 may be through the gNodeB 108.

FIG. 1 shows a single user equipment (UE) 110, which may be one of many such UEs that are configured for use with the communication network 100. The UE 110 supports both LTE and 5G communications. Accordingly, the UE 110 has an LTE radio 112 that communicates wirelessly with the eNodeB 106 of the cell site 104 and a 5G radio 114 that communicates wirelessly with the gNodeB 108 of the cell site 104.

The UE may comprise any of various types of cellular telecommunication devices that are capable of wireless data and/or voice communications, including smartphones and other mobile devices, "Internet-of-Things" (IoT) devices, smart home devices, computers, wearable devices, entertainment devices, industrial control equipment, etc. In some environments, the UE 110 may be referred to as a mobile station (MS).

As described above, the UE 110 may support Dual Connectivity (DC) communications, so that a single communication session might simultaneously use both an LTE connection 116 and a 5G connection 118. Alternatively, a single communication might alternate between the LTE connection 116 and the 5G connection 118, in a sharing technique that is referred to as time-division multiplexing (TDM).

Although the UE 110 is illustrated as communicating through a single cell site 104 using both LTE and 5G communications, it may be that in certain situations the LTE communications are through a first cell site and the 5G communications are through a second, different cell site.

Figure 2:
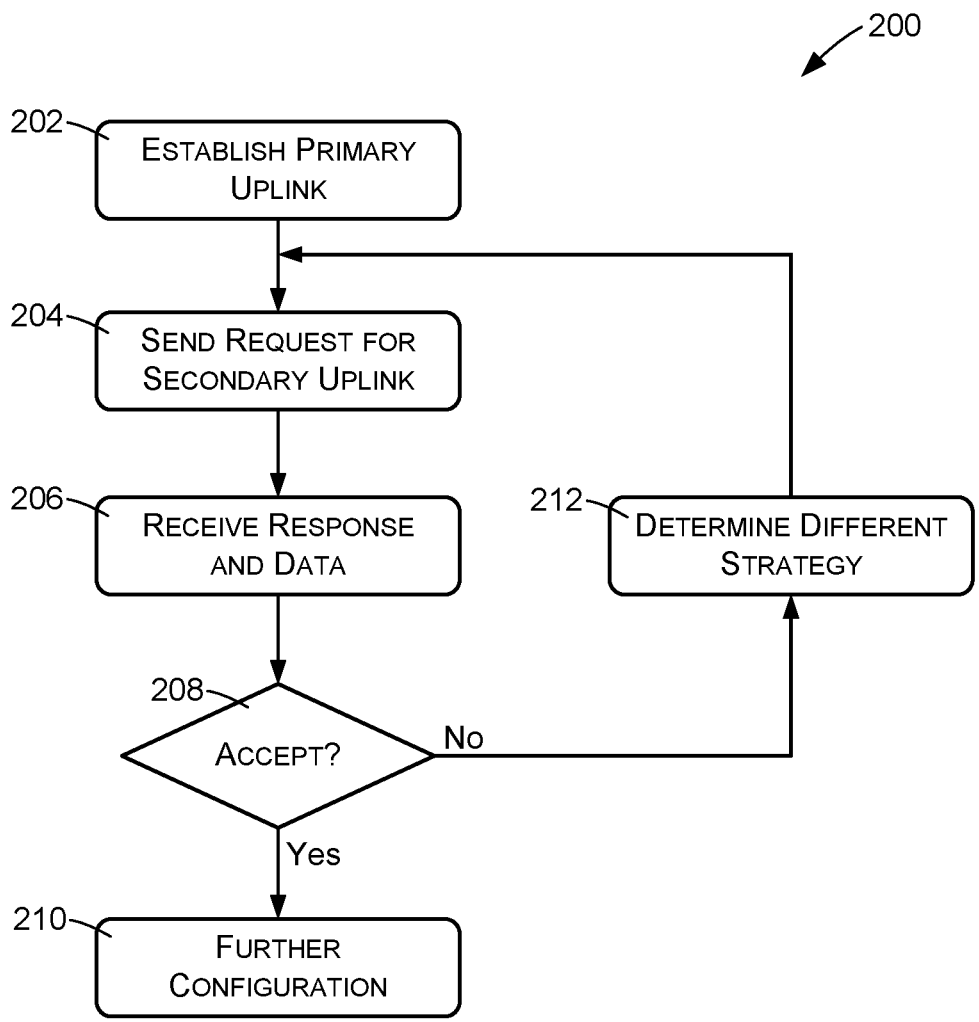
FIGS. 2 and 3 are flow diagrams illustrating example methods of setting up a telecommunication device for dual connectivity.
Figure 3:
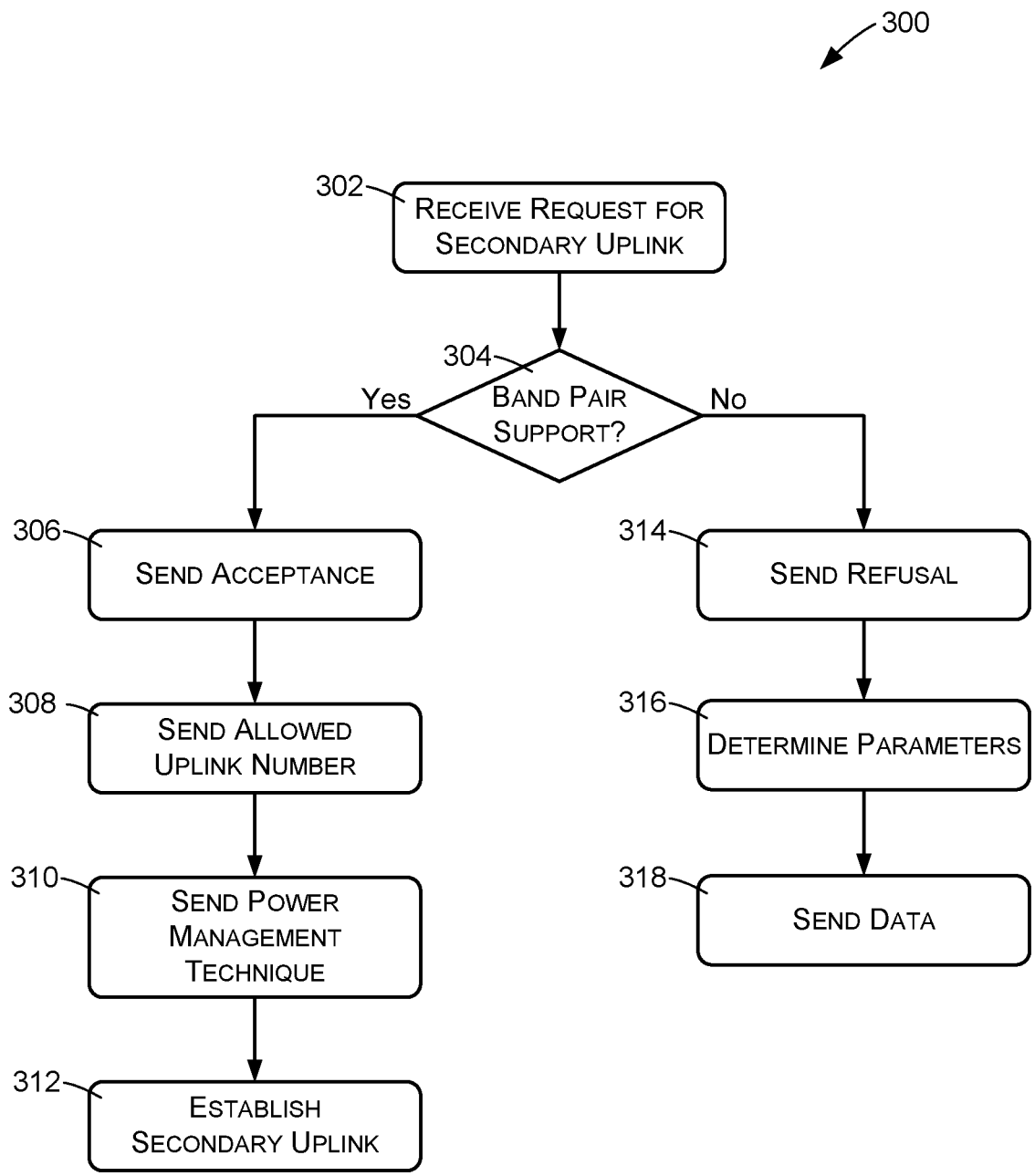

FIGS. 2 and 3 illustrate example methods that may be performed in combination to set up a Dual Connectivity communication session in accordance with the techniques described above. An example method 200 (FIG. 2) illustrates actions performed by a core network, such as core network 102 of FIG. 1, in conjunction with one or more base stations. An example method 300 (FIG. 3) may be performed by a UE, such as by the UE 110 of FIG. 1, in response to communications from the core network and/or base station. Generally, the methods 200 and 300 may be performed during any handoff between cell sites or base stations, although they can also be performed at other times in order to improve communications between a UE and a core network.

Referring first to FIG. 2, an action 202 comprises establishing a primary transmission uplink between the UE and a base station. In the embodiments described herein, the primary transmission uplink comprises an LTE carrier or uplink that is established by the LTE radio of the UE with an eNodeB using LTE protocols. In certain embodiments, the uplink is in a relatively low frequency band, such as a band below 1 GHz that is typically used by LTE systems. Although indicated as being performed by the core network, both the core network and the UE participate in performing the action 202.

An action 204 comprises sending a request to the UE for a secondary radio transmission uplink between the UE and a base station. In the embodiments described herein, the request might be made in accordance with 5G protocols. The request might specify, for example, that the secondary transmission uplink is to be a 5G carrier established by the 5G radio of the UE with a gNodeB, in a specified 5G radio frequency band. In certain embodiments, the request might comprise an RRC Connection Request, and may specify both the band and the channel of the requested carrier. As described above, in some cases the specified 5G frequency band may be a relatively high frequency band, such as a band above 30 GHz.

FIG. 3 shows actions performed by the UE in responding to the request. An action 302 comprises receiving the request for a secondary radio transmission uplink between the UE and the base station. An action 304 comprises determining whether the UE supports the requested band pair. That is, the action 304 determines whether the UE supports the combined, concurrent use of the LTE frequency band of the primary uplink and the 5G frequency band that has been requested for the secondary uplink. In some embodiments, this may comprise determining whether the two bands form a combination that has been classified as "difficult," as described above. More generally, the action 206 may comprise determining whether the particular UE supports a requested "difficult" band combination.

In some embodiments, the UE or UE model may be preconfigured with a lookup table indicating which of many possible LTE/5G band/carrier combinations are supported with adequate receiver sensitivity by the UE, and which are not. The lookup table may be based on previous testing of the UE model, for example. In some cases, the UE may make receiver sensitivity measurements during operation and may update the table based on actually occurring receiver sensitivity measurements.

If the action 304 indicates that the UE does support the requested combination of LTE and 5G bands and/or carriers, an action 306 is performed. The action 306 may comprise sending or returning an acceptance of the request to establish a secondary transmission uplink in the specified 5G frequency band. In certain embodiments, the action 306 may comprise sending a response to a previously received RRC Connection Request message, indicating acceptance of the Request.

One or both of the actions 308 and 310 may be performed in conjunction with the action 306. The action 308 comprises sending an indication of how many radio transmission uplinks can be established by the UE. More specifically, the indication may specify the number of secondary radio transmission uplinks that are supported by the UE in its current environment. This information can be based on established capabilities of the UE, such as whether the UE supports simultaneous LTE/5G uplinks, and can be provided as part of the response to the RRC Connection Request message.

The action 310 comprises sending an indication of a power management technique to be used in conjunction with the primary radio transmission uplink and the secondary radio transmission uplink. In many situations, there will be a regulatory limit on the total output power of the UE. In order to maintain a session between the UE and the base station, it may become necessary to increase the output power of one or both of the primary and secondary uplinks. When the combined total output power of the first and second uplinks has been increased to its upper allowable limit, the output power of either the primary uplink or the secondary uplink may be increased further, while decreasing power in the other uplink to stay below the allowed total output power. Alternatively, the UE might be switched to a time-division multiplexing (TDM) transmission mode, where uplink data transmissions alternate between the primary and secondary uplinks over time.

The core network monitors and controls the amount of power headroom that is available on both of the primary and secondary uplinks, and is part of the decision criteria when switching between simultaneous LTE/5G uplink transmission and TDM LTE/5G uplink transmission.

The power management technique indicated in the action 310 may comprise either (a) reducing output power of one of the first and second radio frequency uplinks to keep total output power of the telecommunication device within an allowed limit as the output power of the other radio frequency uplink is increased; or (b) multiplexing transmissions in the first and secondary radio transmission uplinks over time. The action 310 may specify either of these techniques in conjunction with the action 306.

In some cases, the action 310 may also comprise sending an identification of one of the first and second radio uplinks whose power is to be maintained at the expense of the power of the other radio uplink.

As an example, power management information such as this may in some cases be included in a response to an RRC Connection Request that also indicates acceptance of the Request.

An action 312, which can be performed before or after the actions 308 and 310, comprises establishing the requested secondary uplink, using the requested 5G frequency band.

If the action 304 indicates that the UE does not support the requested combination of LTE and 5G bands and/or carriers, an action 314 is performed of sending or returning a refusal of the request to establish a secondary transmission uplink in the specified 5G frequency band. In certain embodiments, the action 314 may comprise sending a refusal response to a previously received RRC Connection Request message.

An action 316 is performed in conjunction with the action 314 of sending the refusal. The action 316 comprises determining amounts by which concurrently transmitting in the first and second radio frequency bands would cause one or more radio parameters to be outside of allowable limits.

Radio parameters may relate to various performance indicators of the UE. In a described embodiment, the radio parameters include a receiver sensitivity parameter, indicating the sensitivity or sensitivity degradation that would result from concurrent use of the specified or requested frequency bands. The action 316 may comprise comparing the resulting sensitivity to a lower sensitivity limit, or may comprise comparing resulting sensitivity degradation to a degradation limit.

Radio parameters may also, or alternatively, relate to output power of the UE. For example, a radio parameter may indicate the level to which the output power would need to be lowered in order to maintain the receiver sensitivity within acceptable levels. The action 316 may comprise comparing this level of output power to the lowest allowed or highest allowed output power, or to limits by which the lowest or highest output power are allowed to be relaxed.

In particular, the parameters may include:

ΔP: the difference between (a) the maximum 3GPP-allowable output power and (b) the actual reduced output power that would be needed to meet regulatory or 3GPP requirements for receiver sensitivity if using the requested frequency bands; and ΔR: the difference between (a) the 3GPP-required reference sensitivity and (b) the reference sensitivity that would result from using the requested frequency bands.

The maximum allowable output power and the minimum required reference sensitivity may be specified by established standards, such as 3GPP specifications. In some cases, certain of these values may be specified by the network on a per-cell basis in order to maximize coverage and/or minimize signal interference.

Rather than measuring the radio parameters, a particular UE or UE model may be preconfigured with a lookup table indicating these parameters for various frequency band combinations. The lookup table may be based on testing of the UE model, for example. In some cases, the UE may make sensitivity measurements during operation and may update a table such as this based on actually occurring receiver sensitivities for different band, RF carrier, and/or resource block combinations.

An action 318 comprises returning data that indicates one or more of the parameters. The action 318 may be performed in conjunction with the action 314 of sending the refusal response, such as immediately before or after sending the refusal response. In some cases, an RRC refusal response may contain one or more of the parameters. In some embodiments, the actions 316 and 318 may be performed in response to the action 302 of receiving the RRC Connection Request.

Returning to FIG. 2, an action 206, performed by the core network, comprises receiving the response and the associated data that is returned in the action 318 of FIG. 3. An action 208 comprises determining whether the reply indicates an acceptance of the request or a refusal of the request.

If the reply indicates an acceptance, further connection configuration and/or communications are performed in accordance with applicable standards, as indicated by the block 210. In some cases, the further configuration may include configuring a number of transmission uplinks in accordance with the parameter discussed above with reference to the action 308. In some cases, the further configuration may include selecting and implementing a power management scheme in accordance with the data received from the UE, such as the power management technique indicated by the UE in the action 310.

If the reply indicates a refusal of the request, an action 212 is performed. The action 212 comprises analyzing the returned data, such as the sensitivity and power parameters discussed above, to determine a different strategy for using different frequencies and carrier bands among one or more UEs in order to optimize the number of UEs that can be configured to use dual simultaneous transmissions. For example, the core network may select new frequencies and/or carrier bands for use by one or more UEs supported by a base station or a group of neighboring base stations, in a manner that allows an efficient usage of the highest number of frequency bands and/or carriers. The action 212 may include altering or configuring frequencies and carriers assigned to one or more UEs in an attempt to provide good coverage for all UEs service by the base station.

The action 204 is then repeated to again request of the UE a secondary transmission uplink. In this case, the request might indicate a different band/carrier combination for the secondary transmission uplink, in light of the data previously indicated in conjunction with the refusal response received from the UE. The actions 204, 206, 208, and 212 may be repeated until the UE responds that it is able to provide the requested secondary transmission uplink, or until the core network determines to forego the secondary transmission uplink.

Figure 4:
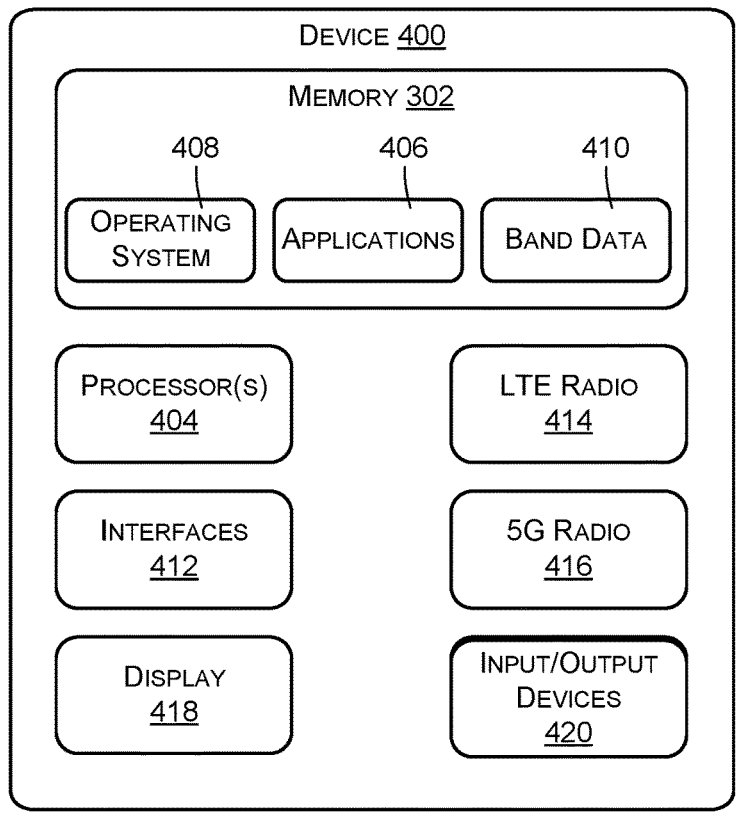
FIG. 4 is a block diagram of an example mobile communications device.

FIG. 4 illustrates an example mobile device 400 that may be used to implement the techniques described herein. The device 400 is an example of a UE 110 as shown in FIG. 1. FIG. 4 shows only basic, high-level components of the device 400. The method 300 of FIG. 3, for example, may be implemented by a device such as the device 400.

The device 400 may include memory 402 and a processor 404. The memory 402 may include both volatile memory and non-volatile memory. The memory 402 can also be described as non-transitory computer-readable media or machine-readable storage memory, and may include removable and non-removable media implemented in any method or technology for storage of information, such as computer executable instructions, data structures, program modules, or other data. Additionally, in some embodiments the memory 402 may include a SIM (subscriber identity module), which is a removable smart card used to identify a user of the device 400 to a service provider network.

The memory 402 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 402 may in some cases include storage media used to transfer or distribute instructions, applications, and/or data. In some cases, the memory 402 may include data storage that is accessed remotely, such as network-attached storage that the device 400 accesses over some type of data communications network.

The memory 402 stores one or more sets of computer-executable instructions (e.g., software) such as programs that embody operating logic for implementing and/or performing desired functionality of the device 400. The instructions may also reside at least partially within the processor 404 during execution thereof by the device 400. Generally, the instructions stored in the computer-readable storage media may include various applications 406 that are executed by the processor 404, an operating system (OS) 408 that is also executed by the processor 404, and data 410. As an example, the data 410 may include lookup tables that indicate various band and band combination properties, such as radio parameters for different band combinations and whether any particular band combination is supported by the device 400.

In some embodiments, the processor(s) 404 is a central processing unit (CPU), a graphics processing unit (GPU), both CPU and GPU, or other processing unit or component known in the art. Furthermore, the processor(s) 404 may include any number of processors and/or processing cores. The processor(s) 404 is configured to retrieve and execute instructions from the memory 402.

The device 400 may have interfaces 412, which may comprise any sort of interfaces known in the art. The interfaces 412 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

The device 400 may also have an LTE radio 414 and a 5G radio 416, which may be used as described above for implementing dual connectivity in conjunction with an eNodeB and a gNodeB. The radios 414 and 416 transmit and receive radio frequency communications via an antenna, through eNodeBs and/or gNodeBs.

The device 400 may have a display 418, which may comprise a liquid crystal display or any other type of display commonly used in telemobile devices or other portable devices. For example, the display 418 may be a touch-sensitive display screen, which may also act as an input device or keypad, such as for providing a soft-key keyboard, navigation buttons, or the like.

The device 400 may have input and output devices 420. These devices may include any sort of output devices known in the art, such as a display (already described as display 418), speakers, a vibrating mechanism, or a tactile feedback mechanism. Output devices may also include ports for one or more peripheral devices, such as headphones, peripheral speakers, or a peripheral display. Input devices may include any sort of input devices known in the art. For example, the input devices may include a microphone, a keyboard/keypad, or a touch-sensitive display (such as the touch-sensitive display screen described above). A keyboard/keypad may be a push button numeric dialing pad (such as on a typical telemobile device), a multi-key keyboard (such as a conventional QWERTY keyboard), or one or more other types of keys or buttons, and may also include a joystick-like controller and/or designated navigation buttons, or the like.

Figure 5:
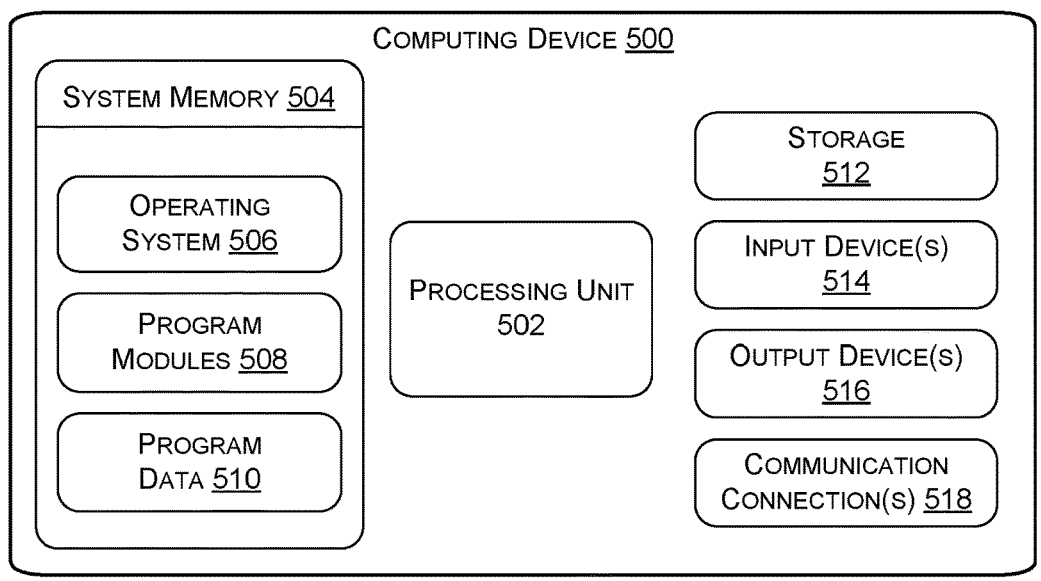
FIG. 5 is a block diagram illustrating high-level components of an example computing device, one or more of which may be used to implement components of core networks, base stations, and other components of a telecommunications system such as shown in FIG. 1.

FIG. 5 is a block diagram of an illustrative computing device 500 such as may be used to implement various components of a core network, a base station, and/or any servers, routers, gateways, administrative components, that may be used by a communications provider etc. One or more computing devices 500 may be used to implement the core network 102, for example.

In various embodiments, the computing device 500 may include at least one processing unit 502 and system memory 504. Depending on the exact configuration and type of computing device, the system memory 504 may be volatile (such as RAM), non-volatile (such as ROM, flash memory, etc.) or some combination of the two. The system memory 504 may include an operating system 506, one or more program modules 508, and may include program data 510.

The computing device 500 may also include additional data storage devices (removable and/or non-removable) such as, for example, magnetic disks, optical disks, or tape. Such additional storage is illustrated in FIG. 5 by storage 512.

Non-transitory computer storage media of the computing device 500 may include volatile and nonvolatile, removable and non-removable media implemented in any method or technology for storage of information, such as computer readable instructions, data structures, program modules, or other data. The system memory 504 and storage 512 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such non-transitory computer-readable storage media may be part of the computing device 500.

In various embodiment, any or all of the system memory 504 and storage 512 may store programming instructions which, when executed, implement some or all of the function functionality described above as being implemented by components of the core network networks 102.

The computing device 500 may also have input device(s) 514 such as a keyboard, a mouse, a touch-sensitive display, voice input device, etc. Output device(s) 516 such as a display, speakers, a printer, etc. may also be included. The computing device 500 may also contain communication connections 518 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. A telecommunication device, comprising:
   a first radio;
   a second radio;
   one or more processors;
   one or more non-transitory computer-readable media storing computer-executable instructions that, when executed by the one or more processors, cause the one or more processors to perform actions comprising:
   establishing a primary radio transmission uplink in a first radio frequency band using the first radio;
   receiving a request for a secondary radio transmission uplink in a second radio frequency band;
   determining whether the telecommunication device supports concurrent radio transmissions in the first and second radio frequency bands by the first and second radios, respectively;
   determining a decreased amount of receiver sensitivity, of at least one of the first and second radios, that would result from concurrent radio transmissions in the first and second radio frequency bands by the first and second radios; and
   in response to determining that the telecommunication device does not support concurrent transmissions in the first and second radio frequency bands by the first and second radios: (a) sending a refusal of the request for a secondary radio transmission uplink and (b) sending a sensitivity parameter that is based at least in part on the decreased amount of receiver sensitivity.

2. The telecommunication device of claim 1, wherein the sensitivity parameter comprises a difference between the decreased amount of receiver sensitivity and an allowed receiver sensitivity.

3. The telecommunication device of claim 1, the actions further comprising:
   determining a reduced amount of output power, of at least one of the first and second radios, that would produce at least a minimum allowed receiver sensitivity during use of the primary and secondary radio transmission uplinks; and
   in further response to determining that the telecommunication device does not support concurrent transmissions in the first and second radio frequency bands, sending a power parameter that is based at least in part on the reduced amount of output power.

4. The telecommunication device of claim 1, wherein the primary radio transmission uplink comprises a Long-Term Evolution (LTE) uplink and the secondary radio transmission uplink comprises a 5th-Generation (5G) transmission uplink.

5. The telecommunication device of claim 1, the actions further comprising sending an indication of how many concurrent radio transmission uplinks can be supported by the telecommunication device.

6. The telecommunication device of claim 1, the actions further comprising sending an indication of a power management technique to be used in conjunction with the primary radio transmission uplink and the secondary radio transmission uplink.

7. The telecommunication device of claim 6, wherein the power management technique comprises:
   reducing output power of one of the primary and secondary radio frequency uplinks to keep total output power of the telecommunication device within an allowed limit; or
   multiplexing transmissions of the first radio and the second radio over time.

8. The telecommunication device of claim 7, wherein the power management technique further comprises sending an identification of the one of the primary and secondary radio frequency uplinks.

9. A method performed by a telecommunication device, comprising:
   establishing a primary radio transmission uplink in a first radio frequency band;
   receiving a request for a secondary radio transmission uplink in a second radio frequency band;
   determining that the telecommunication device does not support concurrent radio transmissions in the first and second radio frequency bands;
   determining an amount by which concurrently transmitting in the first and second radio frequency bands would cause a radio parameter to be outside of an allowable limit; and
   in response to determining that the telecommunication device does not support concurrent radio transmissions in the first and second radio frequency bands, (a) sending a refusal of the request and (b) sending data indicating the amount.

10. The method of claim 9, wherein the data comprises the radio parameter.

11. The method of claim 9, wherein the data comprises a difference between the radio parameter and the allowable limit.

12. The method of claim 9, wherein the radio parameter comprises a radio sensitivity.

13. The method of claim 9, wherein the radio parameter comprises a radio output power.

14. The method of claim 9, wherein the primary radio transmission uplink comprises a Long-Term Evolution (LTE) uplink and the secondary transmission uplink comprises a 5th-Generation (5G) transmission uplink.

15. The method of claim 9, further comprising sending an indication of how many concurrent radio frequency transmission uplinks can be supported by the telecommunication device.

16. The method of claim 9, further comprising sending an indication of a power management technique to be used in conjunction with the primary radio transmission uplink and the secondary radio transmission uplink.

17. The method of claim 16, wherein the power management technique comprises:
    reducing output power of one of the primary and secondary radio frequency uplinks to keep total output power of the telecommunication device within an allowed limit; or
    multiplexing transmissions in the primary and secondary radio frequency uplinks over time.

18. A telecommunication device, comprising:
    one or more processors;
    one or more non-transitory computer-readable media storing computer-executable instructions that, when executed by the one or more processors, cause the one or more processors to perform actions comprising:
        establishing a primary radio transmission uplink in a first radio frequency band;
        receiving, from a base station, a request for a secondary radio transmission uplink in a second radio frequency band; and
        specifying, to the base station, a power management technique to be used in conjunction with the primary radio transmission uplink and the secondary radio transmission uplink, wherein the power management technique comprises:
            at least one of:
                reducing output power of one of the primary and secondary radio frequency uplinks to keep total output power of the telecommunication device within an allowed limit; or
                multiplexing transmissions in the primary and secondary radio frequency uplinks over time; and
            sending an identification of the one of the primary and secondary radio frequency uplinks.

* * * * *